United States Patent
Tanno et al.

(10) Patent No.: US 11,021,022 B2
(45) Date of Patent: Jun. 1, 2021

(54) PNEUMATIC TIRE

(71) Applicant: The Yokohama Rubber Co., LTD., Tokyo (JP)

(72) Inventors: Atsushi Tanno, Hiratsuka (JP); Isamu Kishizoe, Hiratsuka (JP); Yousuke Sakamoto, Hiratsuka (JP)

(73) Assignee: The Yokohama Rubber Co., LTD.

( * ) Notice: Subject to any disclaimer, the term of this patent is extended or adjusted under 35 U.S.C. 154(b) by 665 days.

(21) Appl. No.: 15/101,600

(22) PCT Filed: Dec. 4, 2014

(86) PCT No.: PCT/JP2014/082088
§ 371 (c)(1),
(2) Date: Jun. 3, 2016

(87) PCT Pub. No.: WO2015/083780
PCT Pub. Date: Jun. 11, 2015

(65) Prior Publication Data
US 2018/0162180 A1    Jun. 14, 2018

(30) Foreign Application Priority Data

Dec. 4, 2013 (JP) .............................. JP2013-251016

(51) Int. Cl.
*B60C 19/00* (2006.01)
*B60C 9/22* (2006.01)
(Continued)

(52) U.S. Cl.
CPC ............ *B60C 19/002* (2013.01); *B60C 9/005* (2013.01); *B60C 9/0042* (2013.01);
(Continued)

(58) Field of Classification Search
CPC ........ B60C 9/2204; B60C 9/22; B60C 19/002
See application file for complete search history.

(56) References Cited

U.S. PATENT DOCUMENTS 4,869,307 A * 9/1989 Bormann .............. B60C 9/2009
152/533
5,558,144 A * 9/1996 Nakayasu ............. B60C 9/2009
152/526
(Continued)

FOREIGN PATENT DOCUMENTS

EP    1 795 377       6/2007
JP    62-216803    *  9/1987
(Continued)

OTHER PUBLICATIONS

English machine translation of JP2010-173573. (Year: 2010).*
International Search Report for International Application No. PCT/JP2014/082088 dated Mar. 10, 2015, 4 pages, Japan.

*Primary Examiner* — Robert C Dye
(74) *Attorney, Agent, or Firm* — Thorpe North & Western

(57) ABSTRACT

A pneumatic tire includes a tread portion; sidewall portions; bead portions; a carcass layer disposed extending between the pair of bead portions; a belt layer of a plurality of layers disposed on an outer circumferential side of the carcass layer in the tread portion; and a band-like noise absorbing member adhered to a region corresponding to a tire inner surface of the tread portion along the tire circumferential direction interposed by an adhesive layer. The pneumatic tire further includes a belt cover layer being disposed on an outer circumferential side of the belt layer across an entire width of the belt layer, the belt cover layer including organic fiber cords arranged in the tire circumferential direction; and a rate of change of a dynamic loaded radius when traveling at 270 km/h with respect to a dynamic loaded radius when traveling at 30 km/h being restricted to 2.0% or less.

12 Claims, 4 Drawing Sheets

(51) Int. Cl.
*B60C 9/20* (2006.01)
*B60C 9/00* (2006.01)
*B60C 11/03* (2006.01)
*D02G 3/04* (2006.01)
*D02G 3/48* (2006.01)

(52) U.S. Cl.
CPC .............. *B60C 9/2009* (2013.01); *B60C 9/22* (2013.01); *B60C 9/2204* (2013.01); *B60C 11/03* (2013.01); *D02G 3/045* (2013.01); *D02G 3/48* (2013.01); *B60C 2009/0035* (2013.01); *B60C 2009/2038* (2013.01); *B60C 2009/2214* (2013.01); *B60C 2009/2257* (2013.01); *B60C 2009/2266* (2013.01); *B60C 2009/2285* (2013.01); *B60C 2011/0341* (2013.01); *D10B 2331/02* (2013.01); *D10B 2331/021* (2013.01); *D10B 2401/061* (2013.01)

(56) References Cited

U.S. PATENT DOCUMENTS

| | | | |
|---|---|---|---|
| 7,182,114 | B2* | 2/2007 | Yukawa ............... B60C 19/002 152/450 |
| 2005/0098251 | A1 | 5/2005 | Yukawa |
| 2005/0161138 | A1 | 7/2005 | Yukawa et al. |
| 2005/0217777 | A1* | 10/2005 | Yukawa ................... B60B 3/04 152/450 |
| 2006/0237113 | A1* | 10/2006 | Almonacil ............ B60C 9/2204 152/527 |
| 2007/0131327 | A1 | 6/2007 | Yukawa et al. |
| 2009/0038726 | A1* | 2/2009 | Yukawa ................ B60C 19/002 152/454 |
| 2009/0277551 | A1* | 11/2009 | Yukawa ................ B60C 19/002 152/450 |
| 2011/0308705 | A1 | 12/2011 | Sandstrom et al. |
| 2012/0125507 | A1* | 5/2012 | Bormann ............ B29D 30/0662 152/510 |
| 2013/0087267 | A1 | 4/2013 | Sandstrom et al. |
| 2013/0112325 | A1* | 5/2013 | Mukai ................ B60C 11/0304 152/209.8 |

FOREIGN PATENT DOCUMENTS

| | | | |
|---|---|---|---|
| JP | H04-0159107 | | 6/1992 |
| JP | 2757940 | | 5/1998 |
| JP | H10-0278508 | | 10/1998 |
| JP | 2002-067608 | | 3/2002 |
| JP | 2005-138760 | | 6/2005 |
| JP | 2005-212524 | | 8/2005 |
| JP | 2008-179325 | | 8/2008 |
| JP | 2008-213418 | | 9/2008 |
| JP | 2010-173573 | | 8/2010 |
| JP | 2010-188782 | | 9/2010 |
| JP | 2011-020479 | | 2/2011 |
| JP | 2012-011779 | | 1/2012 |
| KR | 1020110042068 | * | 4/2011 |

* cited by examiner

PNEUMATIC TIRE

TECHNICAL FIELD

The present technology relates to a pneumatic tire with a band-like noise absorbing member adhered to a region corresponding to the tire inner surface of the tread portion, and particularly relates to a pneumatic tire capable of reducing or preventing separation of the noise absorbing member by decreasing the strain of the tire inner surface due to the centrifugal force when traveling at high speeds.

BACKGROUND ART

In pneumatic tires, cavernous resonance caused by the vibration of the air that the tire is filled with is one cause of tire noise. When a tire is run, uneven road surfaces cause a tread portion to vibrate. The vibrations of the tread portion cause the air inside the tire to vibrate which causes cavernous resonance to be generated.

As ways to reduce noise due to such cavernous resonance, configurations have been proposed in which a noise absorbing member is provided within the cavity portion between the tire and the rim of the wheel. Specifically, a band-like noise absorbing member is adhered to a region corresponding to the tire inner surface of the tread portion (for example, see Japanese Unexamined Patent Application Publication Nos. 2002-67608A and 2005-138760A).

However, such pneumatic tires experience radial growth due to the centrifugal force when traveling at high speeds. As a result, the adhering surface of the noise absorbing member undergoes shear strain. In addition, when the adhering surface of the noise absorbing member adhered to the tire inner surface undergoes shear strain repeatedly over a long time, separation of the noise absorbing member from the tire inner surface becomes a problem.

SUMMARY

The present technology provides a pneumatic tire whereby, by disposing a band-like noise absorbing member adhered to a region corresponding to the tire inner surface of the tread portion, separation of the noise absorbing member can be reduced or prevented by decreasing the strain of the tire inner surface due to the centrifugal force when traveling at high speeds.

A pneumatic tire of the present technology is provided with:

a tread portion extending in a tire circumferential direction forming an annular shape;

a pair of sidewall portions disposed on both sides of the tread portion;

a pair of bead portions disposed on an inner side of the sidewall portions in a tire radial direction;

a carcass layer disposed extending between the pair of bead portions;

a belt layer of a plurality of layers disposed on an outer circumferential side of the carcass layer in the tread portion;

a band-like noise absorbing member adhered to a region corresponding to a tire inner surface of the tread portion along the tire circumferential direction interposed by an adhesive layer;

a belt cover layer being disposed on an outer circumferential side of the belt layer across an entire width of the belt layer, the belt cover layer including organic fiber cords arranged in the tire circumferential direction; and a rate of change of a dynamic loaded radius when traveling at 270 km/h with respect to a dynamic loaded radius when traveling at 30 km/h being restricted to 2.0% or less.

In the present technology, the pneumatic tire, with the band-like noise absorbing member adhered to a region corresponding to the tire inner surface of the tread portion along the tire circumferential direction interposed by the adhesive layer, is capable of decreasing the strain in the tire inner surface caused by radial growth due to the centrifugal force when traveling at high speeds. Consequently, the adhesive layer of the noise absorbing member can readily accompany the tire inner surface, and separation of the noise absorbing member can be reduced or prevented. This is achieved by disposing the belt cover layer, including organic fiber cords arranged in the tire circumferential direction, on the outer circumferential side of the belt layer across the entire width thereof and restricting the rate of change of the dynamic loaded radius when traveling at 270 km/h with respect to the dynamic loaded radius when traveling at 30 km/h to 2.0% or less. As a result, the noise reducing effect of the noise absorbing member can be retained over a long time.

In the present technology, dynamic loaded radius is a value calculated by dividing by $2\pi$ the traveling distance per 1 rotation of a tire that is mounted on a regular rim, inflated to a regular internal pressure, and ran on a drum testing machine with a regular load applied. This dynamic loaded radius differs according to the traveling speed of the tire, and the rate of change R is calculated as follows:

$$R=(r_{270}-r_{30})/r_{30}\times 100\%,$$

where $r_{30}$ is the dynamic loaded radius when traveling at 30 km/h, and $r_{270}$ is the dynamic loaded radius when traveling at 270 km/h. A "regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, when the tires are original equipment tires, the genuine wheel the tire is mounted onto is used. "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "inflation pressure" in the case of ETRTO. When the tires are original equipment tires, the air pressure displayed on the vehicle is used. "Regular load" is the load defined by standards for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. However, for a passenger vehicle tire, the "regular load" is 88% of the loads described above. When the tires are original equipment tires, the "regular load" is the wheel load determined by dividing the front and back axle loads described in the vehicle inspection certificate of the vehicle by 2.

The organic fiber cord is preferably a composite cord of intertwined high elasticity yarn and low elasticity yarn, the high elasticity yarn having an elastic modulus of 10,000

MPa or greater and the low elasticity yarn having an elastic modulus of less than 10,000 MPa. With this configuration, the rate of change of the dynamic loaded radius is preferably restricted to 1.8% or less. In such a case, strain of the tire inner surface due to the centrifugal force when traveling at high speeds is effectively reduced, and consequently the adhesive layer of the noise absorbing member readily accompanies the tire inner surface. The elastic modulus of the yarn was obtained from the initial tensile resistance (cN/dtex) measured in accordance with JIS-L1017 "Testing Method for Chemical Fiber Tire Cords". Elastic modulus E' (MPa) is found by the formula $E'=100 \times \rho \times Rd$, where Rd is the initial tensile resistance (cN/dtex) and p is fiber density (g/cm$^3$).

The belt cover layer preferably has a layered structure of two or more layers in at least a shoulder region of the tread portion. As a result of this configuration, the strain of the tire inner surface due to the centrifugal force when traveling at high speeds is effectively reduced, and the adhesive layer of the noise absorbing member readily accompanies the tire inner surface.

The belt cover layer preferably has a layered structure formed by strip material repeatedly wound in the tire circumferential direction, adjacent circumferential portions of the strip material in a tire width direction partially overlapping in a width direction thereof at least in a shoulder region of the tread portion. As a result of this configuration, the strain of the tire inner surface due to the centrifugal force when traveling at high speeds is effectively reduced, and the adhesive layer of the noise absorbing member readily accompanies the tire inner surface.

The pneumatic tire is preferably provided with a land portion disposed between a pair of circumferential grooves on a tire equatorial position in the tread portion. Expansion of the tread portion due to the centrifugal force when traveling at high speeds occurs at a maximum at the tire equatorial position. As a result, expansion of the tire external diameter can be more effectively reduced or prevented by disposing the land portion instead of the circumferential groove at this position.

The noise absorbing member is preferably disposed within a region in the tire width direction in which the belt cover layer is disposed. As a result of this configuration, the strain of the tire inner surface due to the centrifugal force when traveling at high speeds is effectively reduced, and the adhesive layer of the noise absorbing member readily accompanies the tire inner surface.

Each layer of the belt cover layer preferably has a cord count of 30 cords or greater per 50 mm of width. As a result of this configuration, the strain of the tire inner surface due to the centrifugal force when traveling at high speeds is effectively reduced, and the adhesive layer of the noise absorbing member readily accompanies the tire inner surface.

A cord angle of the belt layer with respect to the tire circumferential direction is preferably from 22° to 38°, both inclusive. A belt layer with a high angle is often employed to secure steering stability in high performance tires likely to be used for high-speed traveling. However, when the cord angle of the belt layer increases, the radius of curvature of the tire inner surface when viewed in the tire meridian cross-section decreases. As a result, strain is caused in the adhering surface of the noise absorbing member. Consequently, when the configuration described above is employed in a pneumatic tire provided with such a high angle belt layer, significant enhancement of the adhesion durability of the noise absorbing member can be achieved.

The noise absorbing member is preferably a single noise absorbing member extending in the tire circumferential direction, the noise absorbing member preferably has a uniform thickness in a cross section orthogonal to a longitudinal direction of the noise absorbing member in a range corresponding to at least the adhering surface, and the cross-sectional shape of the noise absorbing member is preferably uniform along the longitudinal direction. As a result of this configuration, the amount of noise absorbing member per area of the adhering surface is maximized and a superior noise reducing effect can be achieved. In addition, a noise absorbing member with such a shape is easily processed leading to low manufacturing costs.

A volume ratio of the noise absorbing member to a cavity portion formed inside the tire when the tire is mounted on a rim is preferably greater than 20%. A noise absorbing member with such a large volume is capable of achieving a superior noise reducing effect. Moreover, even such large noise absorbing members can be secured in a favorable adhesive state over a long time. The volume of the cavity portion is defined as the volume of a cavity portion formed between a tire and a rim when the tire is mounted on a regular rim and inflated to a regular internal pressure.

A hardness of the noise absorbing member is preferably from 60 N to 170 N, both inclusive, and a tensile strength of the noise absorbing member is preferably from 60 kPa to 180 kPa, both inclusive. A noise absorbing member with such physical properties has superior durability against shear strain. The hardness of the noise absorbing member is measured in accordance with JIS-K6400-2 "Flexible Foam Material—Physical Characteristics—Section 2: Hardness and Compressive Strength—Determining Strain Characteristics" using the D method (determining the strength 20 sec after 25% constant compressive stress). In addition, the tensile strength of the noise absorbing member is measured in accordance with JIS-K6400-5 "Flexible Foam Material—Physical Characteristics—Section 5: Determining Tensile Strength, Elongation, and Strength at Break".

The adhesive layer is preferably constituted by double sided adhesive tape, and a peel adhesive strength of the adhesive layer is preferably in a range of 8 N/20 mm to 40 N/20 mm. As a result of this configuration, the fixing strength of the noise absorbing member is suitably maintained and also application of the noise absorbing member and removal of the noise absorbing member upon tire disposal can be easily performed. The peel adhesive strength of the double sided adhesive tape is measured in accordance with JIS-Z0237. Specifically, a double sided adhesive sheet is backed with a PET film of 25 μm thickness by bonding the two together. The backed adhesive sheet is cut into rectangles of 20 mm×200 mm to make test pieces. The release liner is taken off from the test pieces, and the exposed adhesive surface is adhered to a stainless steel plate (SUS304, BA finish) serving as an adherend, with two passes of a 2 kg roller. The test pieces are left for 30 min in an environment of 23° C. and 50% RH. Thereafter, a tensile tester is used and in accordance with JIS Z 0237, the 180° peel adhesive strength to the SUS plate is measured in an environment of 23° C. and 50% RH and conditions of peel angle 180°, pulling speed 300 mm/min.

DETAILED DESCRIPTION

Figure 1:
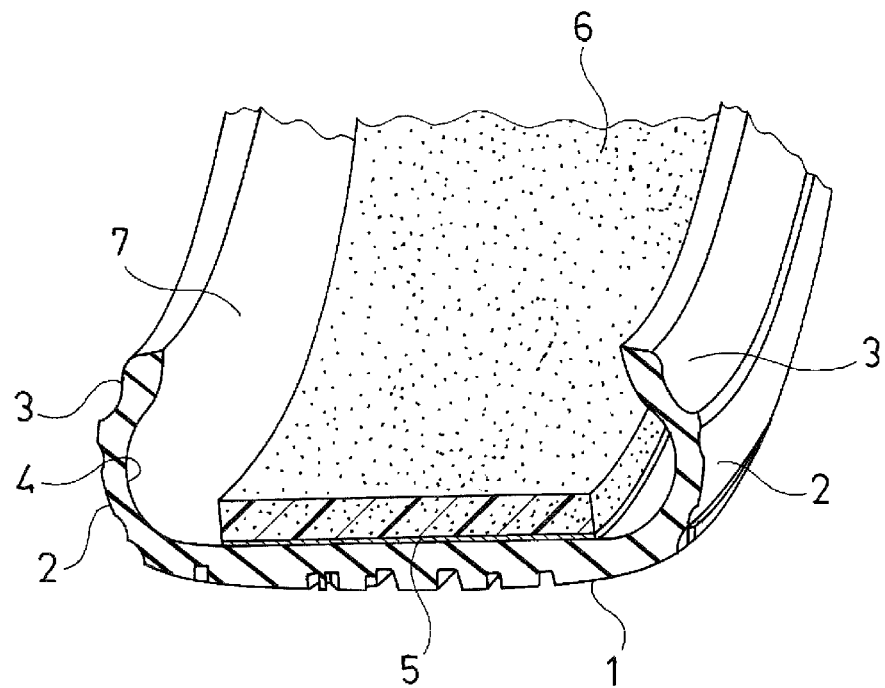
FIG. 1 is a perspective cross-sectional view illustrating a pneumatic tire according to an embodiment of the present technology.
Figure 2:
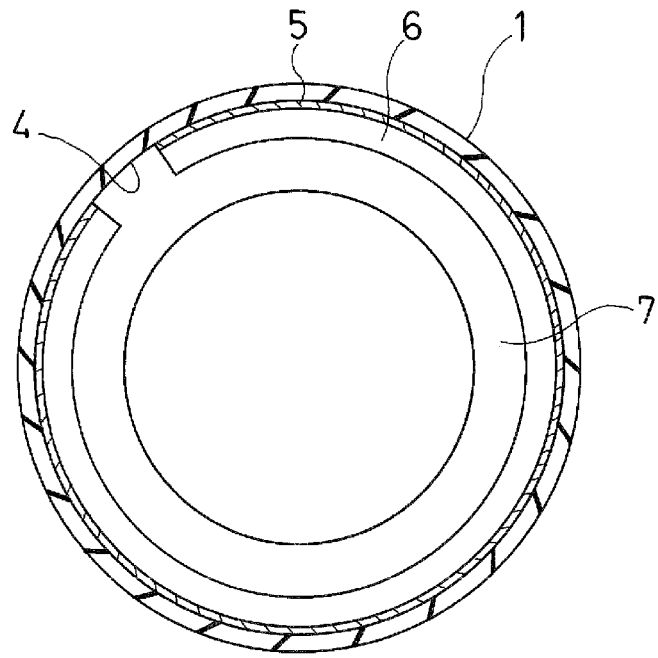
FIG. 2 is an equatorial line cross-sectional view illustrating the pneumatic tire according to the embodiment of the present technology.
Figure 3:
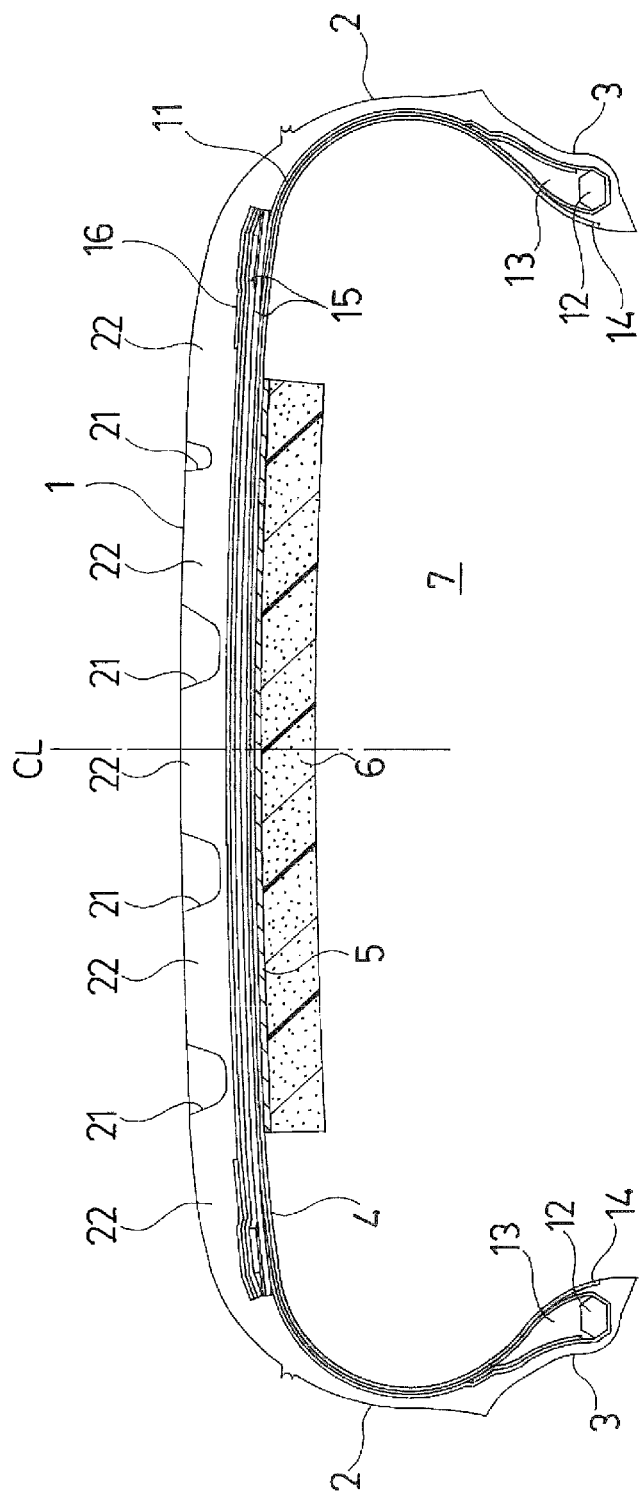
FIG. 3 is a meridian cross-sectional view illustrating the pneumatic tire according to the embodiment of the present technology.

A detailed description of the configuration of the present technology is given below, with reference to the accompanying drawings. FIGS. 1 to 3 illustrate a pneumatic tire according to an embodiment of the present technology. The pneumatic tire according to the present embodiment illustrated in FIGS. 1 and 2 is provided with an annular-shaped tread portion 1 extending in the tire circumferential direction, a pair of sidewall portions 2 disposed on both sides of the tread portion 1, and a pair of bead portions 3 disposed on the inner side of the sidewall portion 2 in the tire radial direction.

As illustrated in FIG. 3, a carcass layer 11 is disposed extending between a pair of bead portions 3, 3. The carcass layer 11 includes a plurality of reinforcing cords extending in the tire radial direction, and is folded back around a bead core 12 disposed in each of the bead portions 3 from a tire inner side to a tire outer side. A bead filler 13 having a triangular cross-sectional shape formed from a rubber composition is disposed on a periphery of the bead core 12. An innerliner layer 14 is layered radially inward of the carcass layer 11 along the tire inner surface 4.

A plurality of belt layers 15 are embedded on the outer circumferential side of the carcass layer 11 in the tread portion 1. These belt layers 15 include a plurality of reinforcing cords that incline with respect to the tire circumferential direction and the reinforcing cords are disposed so that the reinforcing cords of each layer intersect each other. In the belt layers 15, an inclination angle of the reinforcing cords with respect to the tire circumferential direction is set in a range of, for example, 10° to 40°. Steel cords are preferably used as the reinforcing cords of the belt layers 15. For the purpose of enhancing high-speed durability, at least one belt cover layer 16 formed by arranging reinforcing cords at an angle of, for example, not greater than 5° with respect to the tire circumferential direction, is disposed on the outer circumferential side of the belt layers 15 across the entire width thereof. Aramid, or similar organic fiber cords may be used as the reinforcing cords of the belt cover layer 16.

As illustrated in FIG. 3, a plurality of circumferential grooves 21 extending in the tire circumferential direction is formed in the tread portion 1. A plurality of rows of land portions 22 is defined by the circumferential grooves 21. In addition, one of the land portions 22 is disposed on the tire equatorial position CL (the central position in the tire width direction).

The pneumatic tire described above is also provided with a band-like noise absorbing member 6 adhered to a region corresponding to the tire inner surface 4 of the tread portion 1 along the tire circumferential direction interposed by an adhesive layer 5. The noise absorbing member 6 is made of open-cell porous material and has predetermined noise absorbing characteristics derived from the porous material. Polyurethane foam is preferably used as the porous material of the noise absorbing member 6. For the adhesive layer 5, a paste-like adhesive agent or double sided adhesive tape can be used.

In addition, in the pneumatic tire, the rate of change of the dynamic loaded radius when traveling at 270 km/h with respect to the dynamic loaded radius when traveling at 30 km/h is restricted to 2.0% or less. Specifically, the rate of change R is calculated as follows:

$$R = (r_{270} - r_{30})/r_{30} \times 100\%,$$

where $r_{30}$ is the dynamic loaded radius when traveling at 30 km/h, and $r_{270}$ is the dynamic loaded radius when traveling at 270 km/h. In order to achieve such a rate of change of the dynamic loaded radius, the rigidity of a portion or all of the tire casing which includes the carcass layer 11, the belt layers 15, and the belt cover layer 16 must be increased.

The pneumatic tire described above, with the band-like noise absorbing member 6 adhered to a region corresponding to the tire inner surface 4 of the tread portion 1 along the tire circumferential direction interposed by the adhesive layer 5, is capable of decreasing the strain of the tire inner surface 4 caused by radial growth due to the centrifugal force when traveling at high speeds. This is achieved by disposing the belt cover layer 16, including organic fiber cords arranged in the tire circumferential direction, on the outer circumferential side of the belt layers 15 across the entire width thereof and restricting the rate of change of the dynamic loaded radius when traveling at 270 km/h with respect to the dynamic loaded radius when traveling at 30 km/h to 2.0% or less. Consequently, the adhesive layer 5 of the noise absorbing member 6 readily accompanies the tire inner surface 4 and separation of the noise absorbing member 6 can be reduced or prevented. As a result, the noise reducing effect of the noise absorbing member 6 can be retained over a long time. In particular, this effect can be significantly achieved for pneumatic tires with a speed rating code marking (JATMA, ETRTO, TRA) specifying a speed of over 270 km/h.

The organic fiber cords of the belt cover layer 16 are preferably a composite cord of intertwined high elasticity yarn and low elasticity yarn. The high elasticity yarn preferably has an elastic modulus of 10,000 MPa or greater and more preferably from 15,000 MPa to 150,000 MPa, both inclusive. The low elasticity yarn preferably has an elastic modulus of less than 10,000 MPa and more preferably from 500 MPa to 8000 MPa, both inclusive. With the above-described configuration, the rate of change of the dynamic loaded radius is preferably restricted to 1.8% or less. In such a case, strain of the tire inner surface 4 due to the centrifugal force when traveling at high speeds is effectively reduced, and consequently the adhesive layer 5 of the noise absorbing member 6 readily accompanies the tire inner surface 4. In particular, in the case of employing a composite cord of intertwined high elasticity yarn and low elasticity yarn, the presence of low elasticity yarn allows a favorable belt cover layer 16 to be formed with no cord disarray due to the composite cord readily accompanying the lift during tire vulcanization. Moreover, the intertwined high elasticity yarn is put in an appropriately tensioned state due to the lift during tire vulcanization. As a result, the vulcanized tire exhibits a favorable hoop effect derived from the belt cover layer 16.

As the high elasticity yarn, any one selected from aramid fiber, polyolefin ketone (POK) fiber, and polybenzoxazole (PBO) fiber is preferably used. As the low elasticity yarn, preferably aliphatic polyamide fiber is used.

For the belt cover layer 16, at least one layer must be disposed across the entire width of the belt layers 15. However, a layered structure of two or more layers in at least the shoulder regions of the tread portion 1 is preferable. As a result of this configuration, the strain of the tire inner surface 4 due to the centrifugal force when traveling at high speeds is effectively reduced, and the adhesive layer 5 of the noise absorbing member 6 readily accompanies the tire inner surface 4.

Figure 4:
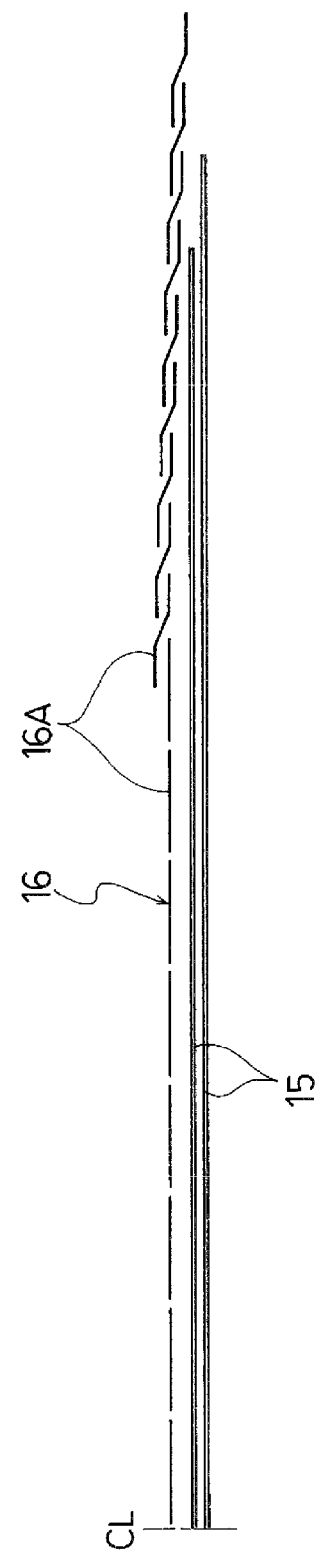
FIG. 4 is a half cross-sectional view illustrating a specific example of belt layers and a belt cover layer of the pneumatic tire of the present technology.
Figure 5:
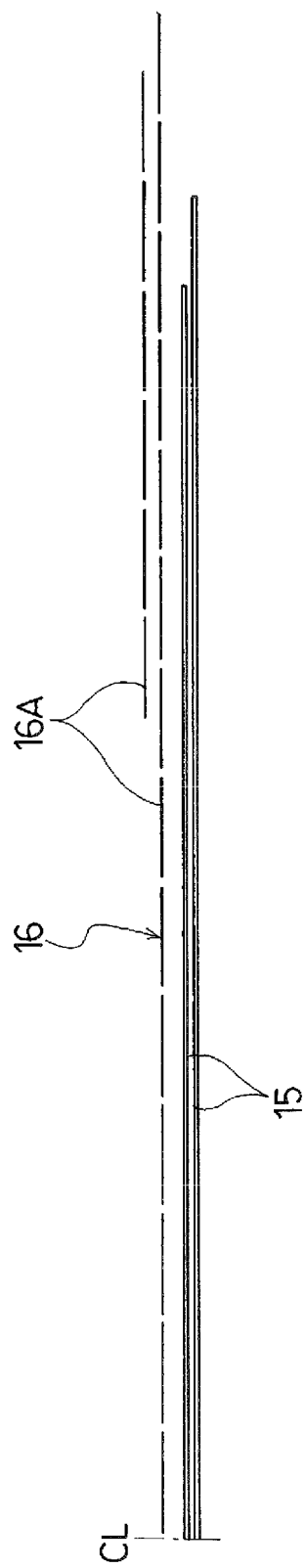
FIG. 5 is a half cross-sectional view of a modified example of belt layers and a belt cover layer of the pneumatic tire of the present technology.

FIGS. 4 and 5 are views that illustrate specific examples of the belt layers and belt cover layer of the pneumatic tire of the present technology. In FIGS. 4 and 5, a configuration is illustrated in which the belt cover layer 16 is formed by repeatedly winding in the tire circumferential direction aligned strip material 16A made from a plurality of organic fiber cords covered in rubber.

The specific example illustrated in FIG. 4 has a configuration in which the strip material 16A is spirally wound from the tire equator CL toward the outer side in the tire width direction, and at the shoulder region of the tread portion 1 a layered structure is formed by the strip material 16A being wound so that adjacent circumferential portions partially overlap in the width direction thereof. In other words, the belt cover layer 16 has a single layer structure at the center region of the tread portion 1 and a two layer layered structure at the shoulder region. In such a case, the adjacent circumferential portions of the strip material 16A in the tire width direction are bonded together. As a result, a favorable hoop effect can be exhibited.

The specific example illustrated in FIG. 5 has a configuration in which the strip material 16A is spirally wound from the tire equator CL toward to outer side in the tire width direction. Thereafter, the strip material 16A is spirally wound from the outer side in the tire width direction toward the tire equator CL, forming a layered structure at the shoulder region of the tread portion 1. In other words, the belt cover layer 16 has a single layer structure at the center region of the tread portion 1 and a two layer layered structure at the shoulder region. In such a case, expansion in the center region of the tread portion 1 is reduced or prevented. As a result, a favorable hoop effect can be exhibited.

The pneumatic tire is preferably provided with a land portion 22 disposed on the tire equatorial position of the tread portion 1 between a pair of circumferential grooves 21, 21. Expansion of the tread portion 1 due to the centrifugal force when traveling at high speeds occurs at a maximum at the tire equatorial position. As a result, expansion of the tire external diameter can be more effectively reduced or prevented by disposing the land portion 22 instead of the circumferential groove 21 at this position.

In addition, the noise absorbing member 6 is preferably disposed within the region in the tire width direction in which the belt cover layer 16 is disposed. As a result of this configuration, the strain of the tire inner surface 4 due to the centrifugal force when traveling at high speeds is effectively reduced, and the adhesive layer 5 of the noise absorbing member 6 readily accompanies the tire inner surface 4.

The cords of each belt cover layer 16 are preferably spaced at 30 cords or greater per 50 mm of width. As a result of this configuration, the strain of the tire inner surface 4 due to the centrifugal force when traveling at high speeds is effectively reduced, and the adhesive layer 5 of the noise absorbing member 6 readily accompanies the tire inner surface 4. When the cord count is less than 30 cords, the strain reduction effect attenuates. In particular, the cord count per 50 mm of width of each belt cover layer 16 is preferably 33 cords or greater, more preferably 35 cords or greater, even more preferably 38 cords or greater, and the upper limit value is preferably 55 cords.

The belt layers 15 of the pneumatic tire preferably have a cord angle of from 22° to 38°, both inclusive, with respect to the tire circumferential direction. In the case of employing a belt layer 15 with a high angle to secure steering stability in high performance tires likely to be used for high-speed traveling, when the cord angle of the belt layer 15 is increased, the radius of curvature of the tire inner surface when viewed in the tire meridian cross-section is decreased. As a result, strain is caused in the adhering surface of the noise absorbing member 6. Consequently, when a configuration to restrict the rate of expansion of the tire external diameter such as that described above is employed in a pneumatic tire provided with such a high angle belt layer 15, significant enhancement of the adhesion durability of the noise absorbing member 6 can be achieved. The cord angle of the belt layer 15 with respect to the tire circumferential direction is preferably from 28° to 36°, both inclusive, more preferably from 29° to 35°, both inclusive, and even more preferably from 30° to 34°, both inclusive.

The pneumatic tire preferably includes a single noise absorbing member 6 that extends in the tire circumferential direction. The noise absorbing member 6 preferably has a uniform thickness in the cross section orthogonal to the longitudinal direction of the noise absorbing member 6 in the range corresponding to at least the adhering surface, and this cross-sectional shape of the noise absorbing member 6 preferably is uniform along the longitudinal direction. In particular, the cross-sectional shape of the cross section orthogonal to the longitudinal direction of the noise absorbing member 6 is preferably rectangular (including a square shape). However in some cases, the cross-sectional shape can be an inverted trapezoid that narrows from the adhering surface side. As a result of this configuration, the amount of noise absorbing member 6 per area of the adhering surface is maximized and a superior noise reducing effect can be achieved. In addition, a noise absorbing member 6 with such a shape is easily processed leading to low manufacturing costs.

A cavity portion 7 is formed between the tire inner surface 4 and the rim when the pneumatic tire is mounted on a rim. The ratio of the volume of the noise absorbing member 6 with respect to the volume of the cavity portion 7 is preferably greater than 20%. A noise absorbing member 6 with such a large volume is capable of achieving a superior noise reducing effect. Moreover, even such large noise absorbing members 6 can be secured in a favorable adhesive state over a long time. Note that the width of the noise absorbing member 6 is preferably in the range of 30 to 90%, both inclusive, of the tire ground contact width. In addition, the noise absorbing member 6 is preferably not annular.

The hardness (JIS-K6400-2) of the noise absorbing member 6 is preferably from 60 N to 170 N, both inclusive, and the tensile strength (JIS-K6400-5) of the noise absorbing member 6 is preferably from 60 kPa to 180 kPa, both inclusive. A noise absorbing member 6 with such physical properties has superior durability against shear strain. When the hardness or tensile strength of the noise absorbing member 6 is too low, the durability of the noise absorbing member 6 decreases. In particular, the hardness of the noise absorbing member 6 is preferably from 70 N to 160 N, both inclusive, and more preferably from 80 N to 140 N, both inclusive. In addition, the tensile strength of the noise absorbing member 6 is preferably from 75 kPa to 165 kPa, both inclusive, and more preferably from 90 kPa to 150 kPa, both inclusive.

The peel adhesive strength (JIS-Z0237:2009) of the adhesive layer 5 is preferably in a range of 8 N/20 mm to 40 N/20 mm, both inclusive. As a result of this configuration, the fixing strength of the noise absorbing member 6 is suitably maintained and also application of the noise absorbing member 6 and removal of the noise absorbing member 6 upon tire disposal can be easily performed. In other words, when the peel strength of the adhesive layer 5 is too low, the fixed state of the noise absorbing member 6 becomes unstable. When the peel strength of the adhesive layer 5 is too great, changing the position of application during application of the noise absorbing member 6 becomes problematic, as does peeling off of the noise absorbing member 6 upon tire disposal. In particular, the peel adhesive strength of the adhesive layer 5 is preferably from 9 N/20 mm to 30 N/20 mm, both inclusive, and more preferably from 10 N/20 mm to 25 N/20 mm, both inclusive.

Examples

Pneumatic tires provided with a tread portion extending in the tire circumferential direction forming an annular shape; a pair of sidewall portions disposed on both sides of the tread portion; a pair of bead portions disposed on the inner side of the sidewall portions in the tire radial direction; a carcass layer disposed extending between the pair of bead portions; a belt layer (a plurality of layers) disposed on the outer circumferential side of the carcass layer in the tread portion; and a band-like noise absorbing member adhered to a region corresponding to the tire inner surface of the tread portion along the tire circumferential direction interposed by an adhesive layer were manufactured having a tire size of 285/35R20. The tires of Comparative Example 1 and Working Examples 1 to 3 were characterized in that a belt cover layer including organic fiber cords arranged in the tire circumferential direction was disposed on the outer circumferential side of the belt layers across the entire width thereof, and the rate of change of the dynamic loaded radius when traveling at 270 km/h with respect to the dynamic loaded radius when traveling at 30 km/h was varied.

In Comparative Example 1, twisted single nylon 66 fiber yarn (2800 dtex) was used for the organic fiber cords of the belt cover layer. The number of twists in the S direction of the nylon 66 fiber yarn was 12 t/10 cm. The elastic modulus of the nylon 66 fiber yarn was 4000 MPa. The cord count per 50 mm of width of the belt cover layer was 30 cords, and the belt cover layer was formed wound in the configuration illustrated in FIG. 5. In Comparative Example 1, the rate of change of the dynamic loaded radius when traveling at 270 km/h with respect to the dynamic loaded radius when traveling at 30 km/h was 2.7% (air pressure of 270 kPa, load of 6.9 kN).

In Working Example 1, a composite cord of intertwined aramid fiber yarn (1670 dtex) and nylon 66 fiber yarn (1400 dtex) was used for the organic fiber cords of the belt cover layer. The lower twist count in the Z direction of the aramid fiber yarn was 38 t/10 cm, the lower twist count in the Z direction of the nylon 66 fiber yarn was 38 t/10 cm, and the upper twist count in the S direction of the nylon 66 fiber yarn was 38 t/10 cm. The elastic modulus of the aramid fiber yarn was 65,000 MPa, and the elastic modulus of the nylon 66 fiber yarn was 4000 MPa. The cord count per 50 mm of width of the belt cover layer was 30 cords, and the belt cover layer was formed wound in the configuration illustrated in FIG. 5. In Working Example 1, the rate of change of the dynamic loaded radius when traveling at 270 km/h with respect to the dynamic loaded radius when traveling at 30 km/h was 2.0% (air pressure of 270 kPa, load of 6.9 kN).

In Working Example 2, a composite cord of intertwined aramid fiber yarn (1670 dtex) and nylon 66 fiber yarn (1400 dtex) was used for the organic fiber cords of the belt cover layer. The lower twist count in the Z direction of the aramid fiber yarn was 38 t/10 cm, the lower twist count in the Z direction of the nylon 66 fiber yarn was 38 t/10 cm, and the upper twist count in the S direction of the nylon 66 fiber yarn was 38 t/10 cm. The elastic modulus of the aramid fiber yarn was 65,000 MPa, and the elastic modulus of the nylon 66 fiber yarn was 4000 MPa. The cord count per 50 mm of width of the belt cover layer was 35 cords, and the belt cover layer was formed wound in the configuration illustrated in FIG. 4. In Working Example 2, the rate of change of the dynamic loaded radius when traveling at 270 km/h with respect to the dynamic loaded radius when traveling at 30 km/h was 1.8% (air pressure of 270 kPa, load of 6.9 kN).

In Working Example 3, a composite cord of intertwined aramid fiber yarn (1670 dtex) and nylon 66 fiber yarn (1400 dtex) was used for the organic fiber cords of the belt cover layer. The lower twist count in the Z direction of the aramid fiber yarn was 38 t/10 cm, the lower twist count in the Z direction of the nylon 66 fiber yarn was 38 t/10 cm, and the upper twist count in the S direction of the nylon 66 fiber yarn was 38 t/10 cm. The elastic modulus of the aramid fiber yarn was 65,000 MPa, and the elastic modulus of the nylon 66 fiber yarn was 4000 MPa. The cord count per 50 mm of width of the belt cover layer was 38 cords, and the belt cover layer was formed wound in the configuration illustrated in FIG. 4. In Working Example 3, the rate of change of the dynamic loaded radius when traveling at 270 km/h with respect to the dynamic loaded radius when traveling at 30 km/h was 1.5% (air pressure of 270 kPa, load of 6.9 kN).

The following points were common amongst Comparative Example 1 and the Working Examples 1 to 3. A cord angle of the belt layer with respect to the tire circumferential direction was 32°. The cross-sectional shape of the noise absorbing member in a cross section orthogonal to the longitudinal direction of the noise absorbing member was rectangular, and this cross-sectional shape was uniform along the tire circumferential direction. The volume ratio of the noise absorbing member to the cavity portion formed inside the tire when the tire is mounted on a rim was 25%. The hardness of the noise absorbing member was 91 N, and the tensile strength of the noise absorbing member was 132 kPa. The peel adhesive strength of the adhesive layer was 16 N/20 mm.

The pneumatic tires of each of the Comparative Example 1 and the Working Examples 1 to 3 were subjected to a 10-hour traveling test using a drum testing machine. The conditions were: the tires were mounted on a wheel with a rim size of 20×10 J and inflated to an air pressure of 200 kPa, a 6.9 kN load was applied, and the speed was set to 280 km/h. After the test, the tires were visually inspected for adhesive peeling of the noise absorbing member. In addition, to measure the adhesive peeling resistance, the distance traveled upon occurrence of adhesive peeling was used as an indicator. This traveling test was performed using a drum testing machine under similar conditions to that of the traveling test described above, and the tire was checked every hour for adhesive peeling of the noise absorbing member. Evaluation results for adhesive peeling resistance are expressed as index values based on the Comparative Example 1 being assigned an index value of 100. Larger index values indicate superior adhesive peeling resistance. The results are shown in Table 1.

TABLE 1

|  | Comparative Example 1 | Working Example 1 | Working Example 2 | Working Example 3 |
|---|---|---|---|---|
| Cord material of the belt cover layer | Nylon | Aramid and nylon | Aramid and nylon | Aramid and nylon |
| Cord count of the belt cover layer (Cords/50 mm) | 30 | 30 | 35 | 38 |
| Wound configuration of the belt cover layer | FIG. 5 | FIG. 5 | FIG. 4 | FIG. 4 |
| Rate of change of the dynamic loaded radius (%) | 2.7 | 2.0 | 1.8 | 1.5 |
| Adhesive peeling of the noise absorbing member | Yes | No | No | No |
| Adhesive peeling resistance | 100 | 110 | 115 | 120 |

As seen in Table 1, the tire of Comparative Example 1 exhibited marked adhesive peeling of the noise absorbing member after the 10-hour traveling test. In contrast, the tires of Working Examples 1 to 3 showed no signs of adhesive peeling of the noise absorbing member after the 10-hour traveling test.

Next, tires of Working Examples 4 to 11 were prepared. These tires had the same configuration as that of Working Example 1 except the hardness and tensile strength of the noise absorbing member, the peel adhesive strength of the adhesive layer, and the elastic modulus of the aramid fiber yarn and the nylon fiber yarn were varied.

The tires of the Working Examples 4 to 11 tested in a manner similar to that described above and were evaluated for adhesive peeling and adhesive peeling resistance of the noise absorbing member after a 10-hour traveling test. The results are shown in Table 2.

TABLE 2

|  | Working Example 4 | Working Example 5 | Working Example 6 | Working Example 7 |
|---|---|---|---|---|
| Cord material of the belt cover layer | Aramid and nylon | Aramid and nylon | Aramid and nylon | Aramid and nylon |
| Elastic modulus of the aramid fiber yarn (MPa) | 65000 | 65000 | 65000 | 65000 |
| Elastic modulus of the nylon fiber yarn (MPa) | 4000 | 4000 | 4000 | 4000 |
| Cord count of the belt cover layer (Cords/50 mm) | 30 | 30 | 30 | 30 |
| Wound configuration of the belt cover layer | FIG. 5 | FIG. 5 | FIG. 5 | FIG. 5 |
| Hardness of the noise absorbing member (N) | 60 | 170 | 91 | 91 |
| Tensile strength of the noise absorbing member (kPa) | 60 | 180 | 132 | 132 |
| Peel adhesive strength of the adhesive layer (N/20 mm) | 16 | 16 | 8 | 40 |
| Rate of change of the dynamic loaded radius (%) | 2.0 | 2.0 | 2.0 | 2.0 |
| Adhesive peeling of the noise absorbing member | No | No | No | No |
| Adhesive peeling resistance | 110 | 110 | 105 | 115 |

|  | Working Example 8 | Working Example 9 | Working Example 10 | Working Example 11 |
|---|---|---|---|---|
| Cord material of the belt cover layer | Aramid and nylon | Aramid and nylon | Aramid and nylon | Aramid and nylon |
| Elastic modulus of the aramid fiber yarn (MPa) | 65000 | 65000 | 54000 | 96000 |
| Elastic modulus of the nylon fiber yarn (MPa) | 2900 | 8000 | 4000 | 4000 |
| Cord count of the belt cover layer (Cords/50 mm) | 30 | 30 | 30 | 30 |
| Wound configuration of the belt cover layer | FIG. 5 | FIG. 5 | FIG. 5 | FIG. 5 |
| Hardness of the noise absorbing member (N) | 91 | 91 | 91 | 91 |
| Tensile strength of the noise absorbing member (kPa) | 132 | 132 | 132 | 132 |
| Peel adhesive strength of the adhesive layer (N/20 mm) | 16 | 16 | 16 | 16 |
| Rate of change of the dynamic loaded radius (%) | 2.0 | 2.0 | 2.1 | 1.8 |
| Adhesive peeling of the noise absorbing member | No | No | No | No |
| Adhesive peeling resistance | 110 | 110 | 109 | 115 |

As seen in Table 2, the tires of Working Examples 4 to 7 in which the hardness and tensile strength of the noise absorbing member and the peel adhesive strength of the adhesive layer was varied showed no signs of adhesive peeling of the noise absorbing member after 10 hours of traveling, similar to Working Example 1. In addition, as seen in the evaluation results of Working Examples 8 to 11, configurations in which the elastic modulus of the aramid fiber yarn and the nylon fiber yarn were varied also achieved a similar result.

The invention claimed is:

1. A pneumatic tire, provided with:
   a tread portion extending in a tire circumferential direction forming an annular shape, the tread portion comprising circumferential grooves;
   a pair of sidewall portions disposed on both sides of the tread portion;
   a pair of bead portions disposed on an inner side of the sidewall portions in a tire radial direction;
   a carcass layer disposed extending between the pair of bead portions;
   a belt layer of a plurality of layers disposed on an outer circumferential side of the carcass layer in the tread portion;
   a band-like noise absorbing member adhered to a region corresponding to a tire inner surface of the tread portion along the tire circumferential direction interposed by an adhesive layer, the noise absorbing member extending beneath all of the circumferential grooves in the tread portion;
   a belt cover layer being disposed on an outer circumferential side of the belt layer across an entire width of the belt layer, the belt cover layer including organic fiber cords arranged in the tire circumferential direction, wherein the organic fiber cords are a composite of intertwined high elasticity yarn and low elasticity yarn, the high elasticity yarn having an elastic modulus of from 15,000 MPa to 150,000 MPa and the low elasticity yarn having an elastic modulus of from 500 MPa to 8000 MPa; and
   a rate of change of a dynamic loaded radius when traveling at 270 km/h with respect to a dynamic loaded radius when traveling at 30 km/h being restricted to 1.8% or less; wherein
   a hardness of the noise absorbing member is from 60 N to 170 N, both inclusive; and a tensile strength of the noise absorbing member is from 60 kPa to 180 kPa, both inclusive;
   a volume ratio of the noise absorbing member to a cavity portion formed inside the tire when the tire is mounted on a rim is greater than 26%; and
   the belt cover layer includes a strip material repeatedly wound in the tire circumferential direction and has a layered structure in at least one shoulder region of the tread portion formed by the strip material so that adjacent circumferential portions partially overlap in the width direction of the strip material where an inner portion of the strip material in the tire width direction is located outward in the tire radial direction and an outer portion of the strip material in the tire width direction is located inward in the tire radial direction.

2. The pneumatic tire according to claim 1, wherein a land portion is disposed between a pair of the circumferential grooves on a tire equatorial position in the tread portion.

3. The pneumatic tire according to claim 1, wherein the noise absorbing member is disposed within a region in the tire width direction in which the belt cover layer is disposed.

4. The pneumatic tire according to claim 1, wherein each layer of the belt cover layer has a cord count of 30 cords or greater per 50 mm of width.

5. The pneumatic tire according to claim 1, wherein a cord angle of the belt layer with respect to the tire circumferential direction is from 22° to 38°, both inclusive.

6. The pneumatic tire according to claim 1, wherein the noise absorbing member is a single noise absorbing member extending in the tire circumferential direction, the noise absorbing member has a uniform thickness in a cross section orthogonal to a longitudinal direction of the noise absorbing member in a range corresponding to at least the adhering surface, and the cross-sectional shape of the noise absorbing member is uniform along the longitudinal direction.

7. The pneumatic tire according to claim 1, wherein the adhesive layer is constituted by double sided adhesive tape, and a peel adhesive strength of the adhesive layer is in a range of 8 N/20 mm to 40 N/20 mm.

8. The pneumatic tire according to claim 1, wherein the noise absorbing member is constituted by open-cell porous material.

9. The pneumatic tire according to claim 8, wherein the porous material is polyurethane foam.

10. The pneumatic tire according to claim 1, wherein the tread portion comprises two of the circumferential grooves on each side of the tire equator, and outermost circumferential grooves on each side of the tire equator have a groove width which differs from one another.

11. A pneumatic tire, provided with:
    a tread portion extending in a tire circumferential direction forming an annular shape, the tread portion comprising circumferential grooves;
    a pair of sidewall portions disposed on both sides of the tread portion;
    a pair of bead portions disposed on an inner side of the sidewall portions in a tire radial direction;
    a carcass layer disposed extending between the pair of bead portions;
    a belt layer of a plurality of layers disposed on an outer circumferential side of the carcass layer in the tread portion;
    a band-like noise absorbing member adhered to a region corresponding to a tire inner surface of the tread portion along the tire circumferential direction interposed by an adhesive layer, the noise absorbing member extending beneath all of the circumferential grooves in the tread portion;
    a belt cover layer being disposed on an outer circumferential side of the belt layer across an entire width of the belt layer, the belt cover layer including organic fiber cords arranged in the tire circumferential direction;
    a rate of change of a dynamic loaded radius when traveling at 270 km/h with respect to a dynamic loaded radius when traveling at 30 km/h being restricted to 2.0% or less;
    a width of the noise absorbing member is in a range of 30 to 90% of a tire ground contact width; wherein
    a hardness of the noise absorbing member is from 60 N to 170 N, both inclusive; and a tensile strength of the noise absorbing member is from 60 kPa to 180 kPa, both inclusive;
    a volume ratio of the noise absorbing member to a cavity portion formed inside the tire when the tire is mounted on a rim is greater than 26%; and
    the belt cover layer includes a strip material repeatedly wound in the tire circumferential direction and has a layered structure in at least one shoulder region of the tread portion formed by the strip material so that adjacent circumferential portions partially overlap in the width direction of the strip material where an inner portion of the strip material in the tire width direction is located outward in the tire radial direction and an outer portion of the strip material in the tire width direction is located inward in the tire radial direction.

12. The pneumatic tire according to claim 11, wherein the tread portion comprises two of the circumferential grooves on each side of the tire equator, and outermost circumferential grooves on each side of the tire equator have a groove width which differs from one another.

\* \* \* \* \*